United States Patent
Weber et al.

[11] 3,889,921
[45] June 17, 1975

[54] MOULD FOR ARTICLE WITH CIRCUMFERENTIAL UNDERCUT FLANGES

[75] Inventors: Christain Weber, Mutschellen; Alfred Puck, Basel; Peter Voirol, Binningen, all of Switzerland

[73] Assignee: Ciba-Geigy Corporation, Ardsley, N.Y.

[22] Filed: May 22, 1974

[21] Appl. No.: 472,259

[30] Foreign Application Priority Data
May 28, 1973 Germany............................ 2327108

[52] U.S. Cl. .................. 249/161; 249/134; 249/66; 425/DIG. 58
[51] Int. Cl. ............................................. B29c 7/00
[58] Field of Search ............ 249/59, 83, 95, 96, 97, 249/66, 105, 107, 110, 134, 161, 162, 170, 171; 425/DIG. 58

[56] References Cited
UNITED STATES PATENTS

| | | | |
|---|---|---|---|
| 1,304,571 | 5/1919 | Kirk et al. | 249/134 X |
| 2,792,613 | 5/1957 | Hewitt | 425/DIG. 58 |
| 2,922,255 | 1/1960 | Broderick et al. | 249/134 X |
| 2,978,780 | 4/1961 | Clarkson | 425/DIG. 58 |
| 3,097,397 | 7/1963 | Leach et al. | 249/161 X |
| 3,171,163 | 3/1965 | Ford et al. | 249/170 X |
| 3,225,414 | 12/1965 | Dean | 249/105 |
| 3,236,491 | 2/1966 | Keissamen | 249/96 |
| 3,595,301 | 7/1971 | Bauer | 425/DIG. 58 |

FOREIGN PATENTS OR APPLICATIONS
1,249,505 9/1967 Germany .................... 425/DIG. 58

*Primary Examiner*—J. Howard Flint, Jr.

[57] ABSTRACT

A mould comprising a plurality of elements movable relative to one another in rectilinear paths to open and close the mould, the closed mould defining the surface of a moulding with a plurality of circumferential constant-profile flanges all undercut in the same direction with the surface being generated by translation of a planar profile curve through a series of profile planes so that each point on the profile curve traverses a respective closed curve in a respective cross-sectional plane perpendicular to all the profile planes wherein:

the direction of movement of each element is so inclined to the cross-sectional planes that no part of that element penetrates into or through the surface of the moulding during movement, and for each element the angle between all profile planes intersecting that element when the mould is closed and a movement plane perpendicular to the cross-sectional planes and containing the direction of movement of that element is less than 90°.

14 Claims, 18 Drawing Figures

MOULD FOR ARTICLE WITH CIRCUMFERENTIAL UNDERCUT FLANGES

BACKGROUND OF THE INVENTION AND PRIOR ART

This invention relates to a mould for a moulding with a plurality of constant-profile flanges all undercut in the same direction.

Mouldings which are not undercut can be produced in simple re-usable moulds which usually comprise just two parts. As a rule, undercut mouldings of this kind can be produced in re-usable moulds only if the mould has a number of individual elements, otherwise the finished articles cannot be released from the mould. For instance, electric insulators having rotational symmetry and which have a number of undercut circumferential flanges can of course be cast in a mould which is divided in two along an axial section and whose interior receives insert rings to a number corresponding to the number of undercuts in the end product, such rings also being divided in two along an axial section. To release the finished article from the mould, the cast insulator together with the rings is first removed from the main mould, whereafter the split rings are removed by first being moved axially of the insulator, whereafter each half of a ring is withdrawn at an appropriate angle to the insulator axis between the flanges forming the insulator skirts. Of course, there must be sufficient space between each two circumferential flanges for it to be possible to move the rings at all; consequently, insulators produced in this way are relatively long.

Clearly, because of the relatively considerable amount of labour needed in this method, it is best suited to prototype production, whereas it is unsuitable for the mass production of mouldings having undercut annular beads or projections or the like, since for mass production all working steps must be highly mechanized and components and movements must be reduced to a minimum.

However, there is a considerable demand for mouldings which have undercut circumferential flanges. For instance, it has been found that electric insulators which have undercut skirts are much more satisfactory, more particularly as regards saline mists, than insulators having non-undercut skirts. Unfortunately, it has so far proved impossible to achieve economical mass production of articles of this kind, in particular of insulators, by casting or pressing.

SUMMARY OF THE INVENTION

According to the invention there is provided a mould comprising a plurality of elements movable relative to one another in rectilinear paths to open and close the mould, the closed mould defining the surface of a moulding with a plurality of circumferential constant-profile flanges all undercut in the same direction with the surface being generated by translation of a planar profile curve through a series of profile planes so that each point on the profile curve traverses a respective closed curve in a respective cross-sectional plane perpendicular to all the profile planes wherein:

the direction of movement of each element is so inclined to the cross-sectional planes that no part of that element penetrates into or through the surface of the moulding during movement, and for each element the angle between all profile planes intersecting that element when the mould is closed and a movement plane perpendicular to the cross-sectional planes and containing the direction of movement of that element is less than 90°.

The embodiments of the invention described hereinafter require no insert rings nor any other auxiliary shaping means; thus only very few mould elements are required, resulting in a cheap construction.

BRIEF DESCRIPTION OF THE DRAWINGS

Specific embodiments of the invention will now be described by way of example, with reference to the accompanying drawings wherein.

Figures 1, 2:
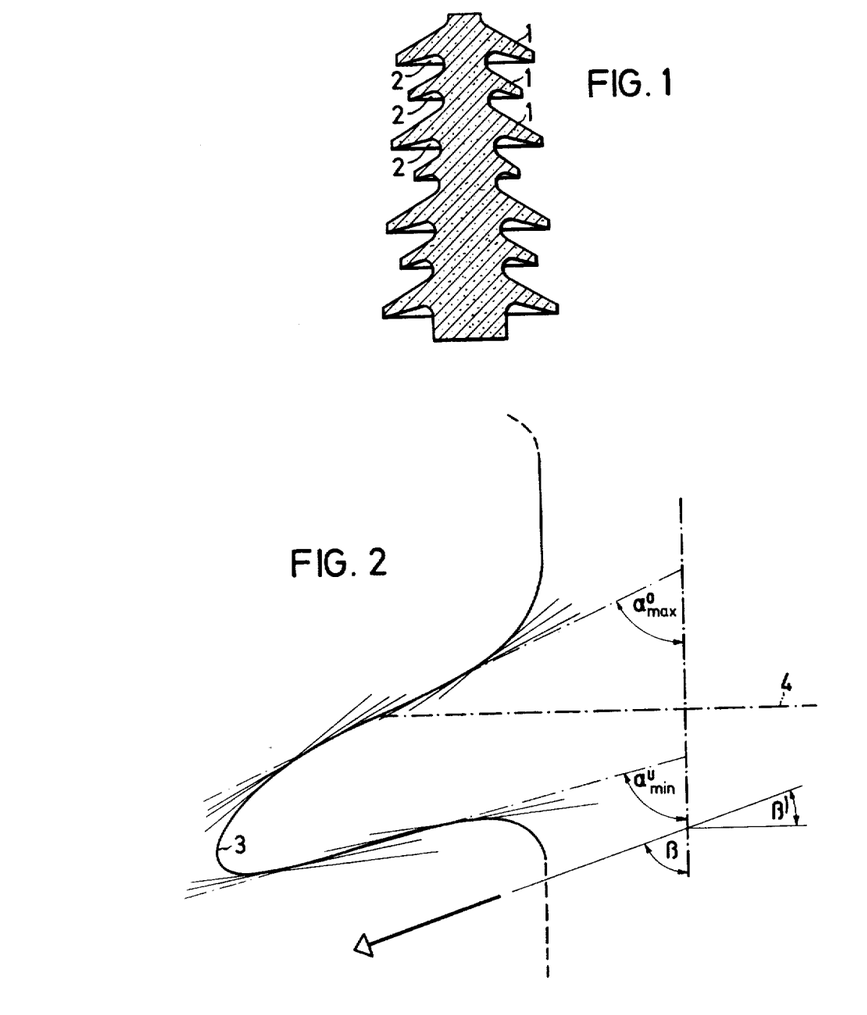
FIG. 1 is an axial section through a moulding.
FIG. 2 is a view to an enlarged scale showing a detail of the moulding of FIG. 1.
Figure 3:
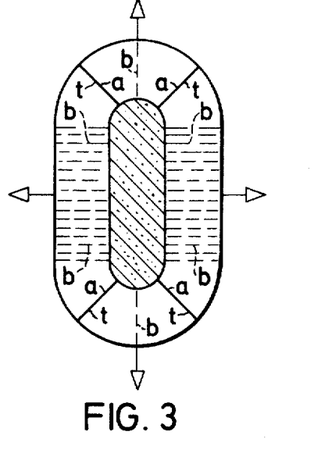
FIGS. 3–7 show various possible cross-sectional shapes for mouldings.
Figure 4:
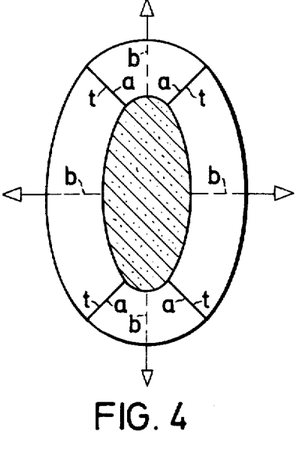
Figure 5:
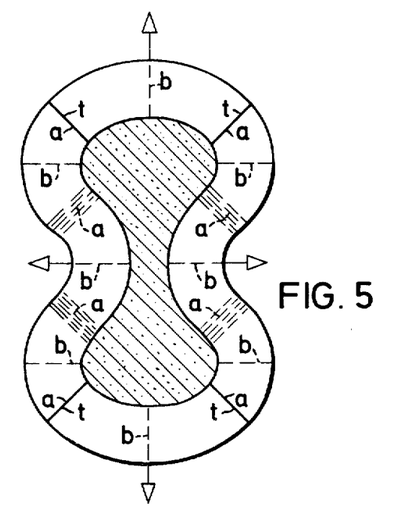
Figure 6:
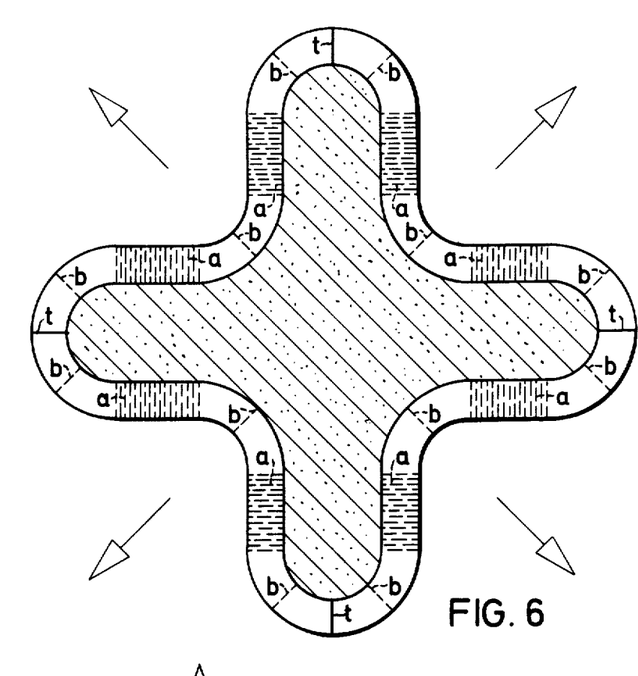
Figure 7:
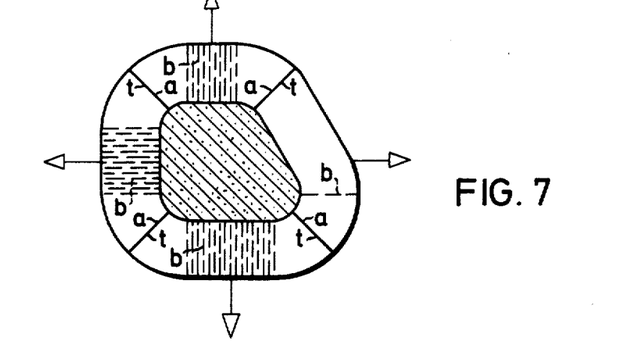

The main features of a moulding can best be gathered from the embodiment shown in FIG. 1, the moulding having a number of circumferential flanges 1 which are all undercut in the same direction. The undercuts have the reference 2.

As can be gathered from FIG. 2, the geometric shape of each flange 1 is determined by translation of a planar profile curve through a series of profile planes so that each point on the profile curve traverses a closed curve 4 in a cross-sectional plane perpendicular to all the profile planes. Each flange 1 therefore has a constant profile, but the profiles of individual flanges of a single moulding may readily differ from one another.

In most cases the mouldings have rotational symmetry, i.e., the curve 4 is circular. However, closed curves other than circles are possible, as shown by the sections illustrated in FIGS. 3 to 7 showing cross-sectional planes of differently shaped mouldings. Of most practical interest are mouldings having two planes of symmetry perpendicular to one another. Such mouldings have a pleasing external shape, as well as the considerable advantage that they can be made in relatively simple moulds.

Figure 8:
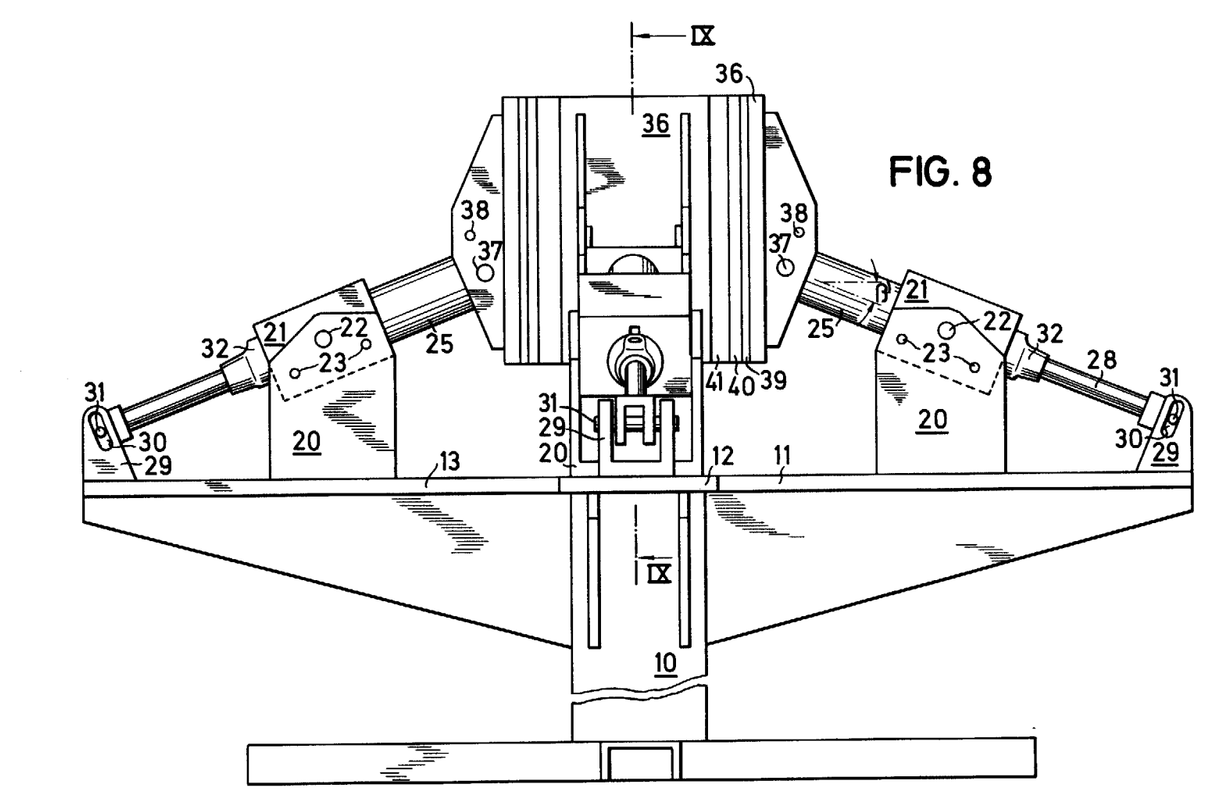
FIG. 8 is a view in side elevation of an embodiment.
Figure 9:
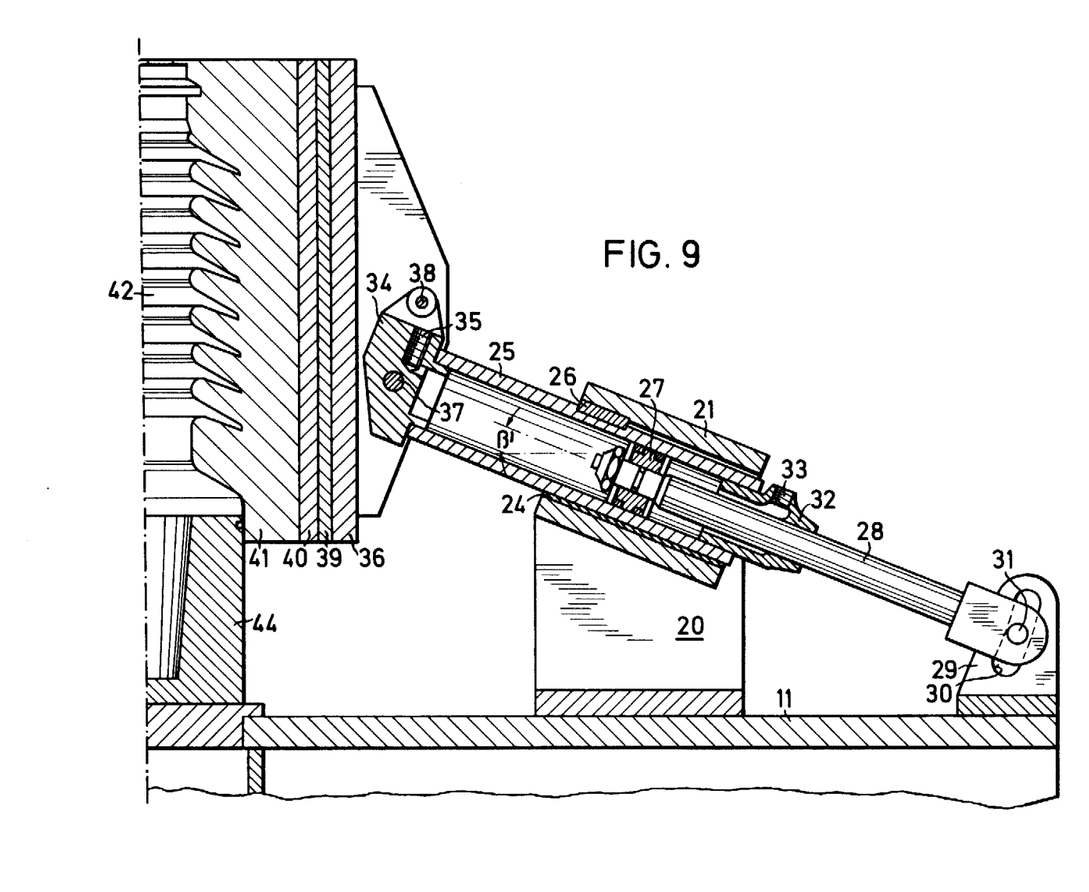
FIG. 9 is a section on the line IX—IX of FIG. 8.
Figure 10:
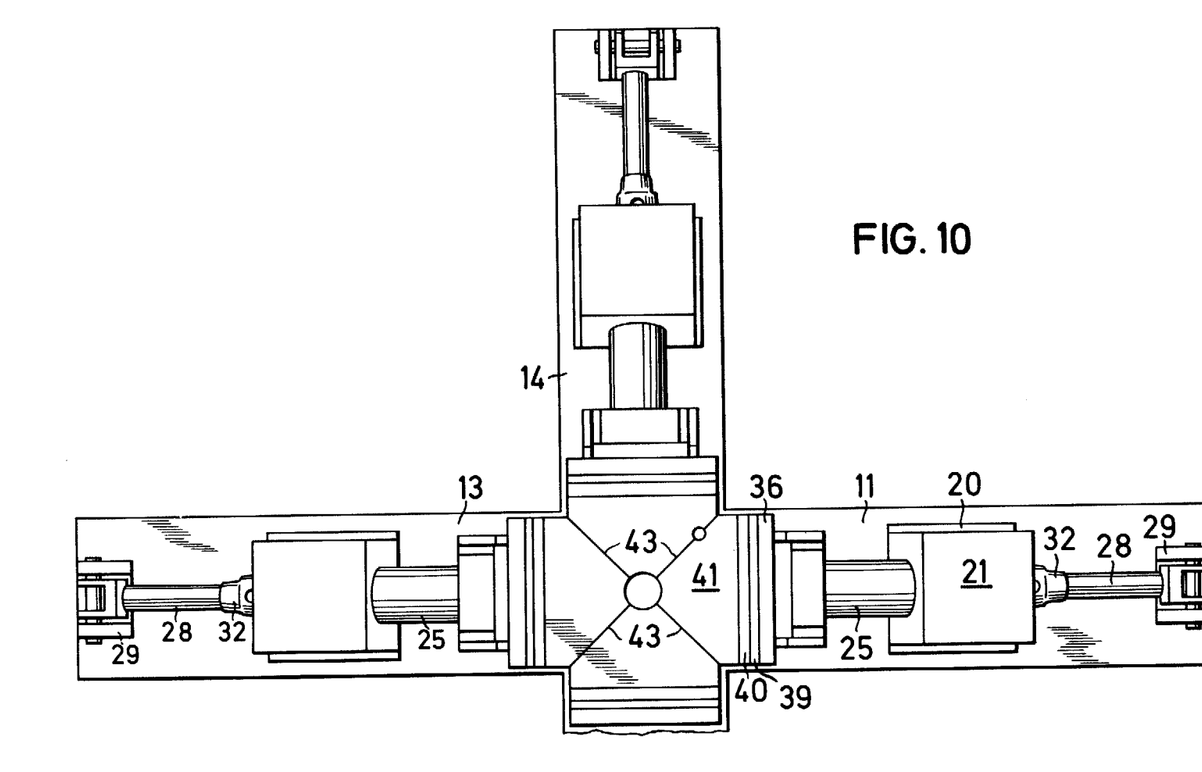
FIG. 10 is a plan view of the apparatus shown in FIGS. 8 and 9.

FIGS. 8 to 10 show a very advantageous mould for producing the mouldings described. On a base 10 there are four arms 11–14 which are disposed in a cross and whose carrying surfaces are disposed in a horizontal plane. The mould is in the form of four completely identical elements each disposed on one of the arms 11–14; consequently, only one of the component elements will be described in greater detail hereinafter.

A bearing pedestal 20 is disposed substantially at the centre of arm 11 and carries a bearing sleeve 21 for a guide tube 25 to be described hereinafter. Sleeve 21 is pivotally connected to pedestal 20 by way of two pins 22, the pivot axis extending parallel to the support surface of the arm 11, i.e., horizontally. The pivot axis is also perpendicular to the direction in which the arm 11 extends away from the centre of the base 10. Sleeve 21 is not freely pivotable but can be located in its position relative to the horizontal by means of four locating screws 23 so as to pivot within a limited angular range $\beta'$.

Disposed in sleeve 21 is a bush 24 which receives guide tube 25. The same has a key 26 which can slide in a longitudinal groove (not referenced) in bush 24 and thus prevent tube 25 from turning in its sliding bearing. Tube 25 can therefore move only axially in bush 24.

A piston 27 sealed by known sealing means is displaceable in tube 25 and is disposed at one end of a piston rod 28 whose other end is anchored in an abutment 29 disposed at the outer end of arm 11. Abutment 29 is formed with an arcuate slot 30 whose centre of curvature is disposed on the axis of the pins 22 in pedestal 20. The piston rod end is connected to abutment 29 by means of a pin 31 which can move in slot 30. These features enable sleeve 21, and therefore tube 25 and rod 28, to be pivoted without any change in their relative axial position.

The guide tube end near abutment 29 is sealed by a sealing ring 32 mounted for movement on piston rod 28. Ring 32 also has an inlet 33 for a pressure medium, such as compressed air or oil, through which the pressure medium can reach the space between the ring 32 and the piston 27.

The other end of tube 25 is closed by a bearing head 34 which also has an inlet 35 for the pressure medium. The tube 25 can move through its pre-adjusted angle $\beta'$ relatively to the horizontal either towards or away from the central axis of the complete apparatus according as one or the other of the two guide-tube chambers which the stationary piston 27 separates from one another is supplied with pressure medium.

A mounting plate 36 for a mould element is strengthened by stiffening ribs and pivotally mounted on head 34 by means of a pin 37 and can be located by means of locating screws 38, the pivot axis being parallel to the axes of the pins 22, 31. Plate 36 receives an insulating plate 39 on which a mould baseplate 40 can be placed. Baseplate 40 carries one of four mould elements 41 of a re-usable mould. The mould when closed defines the surface of a space 42 corresponding to the required moulding whose cross-sectional planes are horizontal. Correspondingly, the profile planes of the space 42 are vertical. Boundary planes 43 along which the elements adjoin one another and along which the complete mould can be divided are vertical too and, in the example shown, coincide each with a profile plane of the space 42.

Secured on the central axis of base 10 is a cylindrical pin 44 which extends vertically upwards into the bottom portion of the mould and which serves to centre the various mould elements 41. The composition to be used for casting the article reaches the mould interior by way of a supply line (not shown) in the form of a channel in one each of two contiguous mould boundary or separation planes. The mould has a top air venting aperture (not shown). The discrete mould elements 41 can be sealed to one another by packing cords placed in corresponding grooves in the sealing surfaces of the elements 41.

If it is required to cast the article from a highly reactive casting resin composition by injection moulding all parts of the mould must be of a size and design such as to be able to withstand the pressure load arising in such process. More particularly, the force which keeps the mould elements closed together must be able to resist the positive pressure arising in the mould, and this pressure may be 4 atmospheres or higher.

Figure 11:
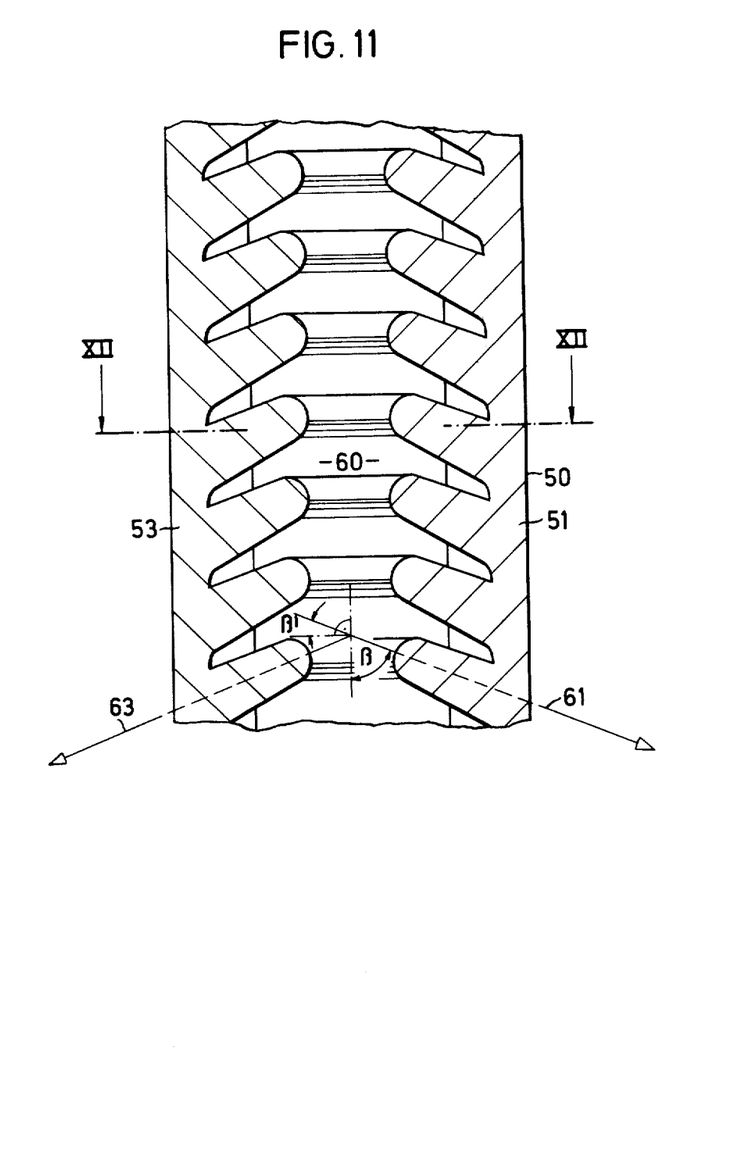
FIG. 11 shows a detail of FIG. 9.
Figure 12:
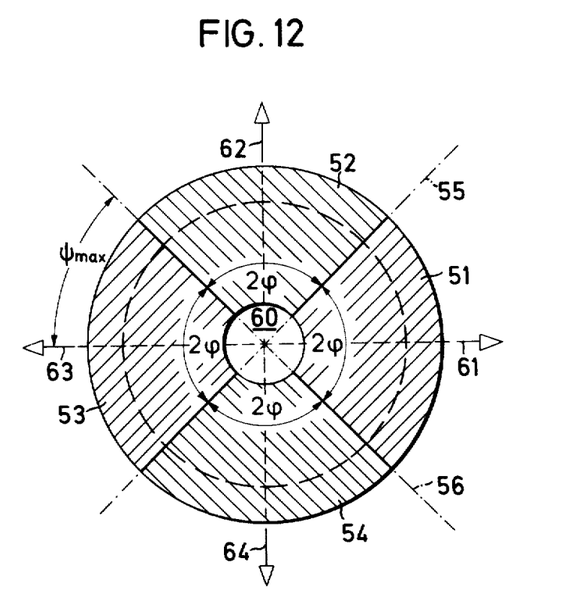
FIG. 12 is a section on the line XII—XII of FIG. 11.
Figure 13:
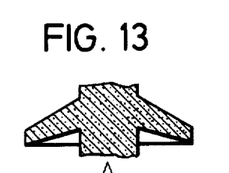
FIGS. 13–15 are partial views of various axially sectioned mouldings.
Figure 14:
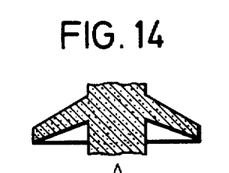
Figure 15:
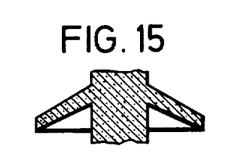
Figure 16:
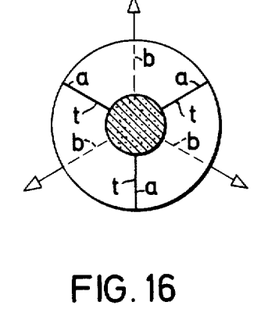
FIGS. 16–18 are cross-sections corresponding to FIGS. 13–15.
Figure 17:
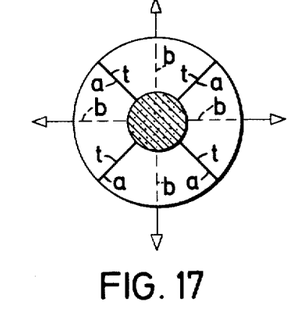
Figure 18:
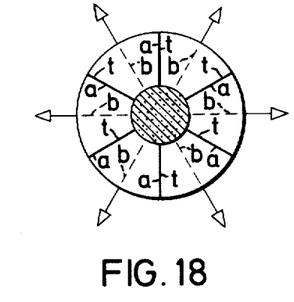

FIG. 11 and FIG. 12 are a view in longitudinal section and cross-section respectively through a closed mould 50. Mould 50 comprises four elements 51–54 which in cross-section resemble sectors of a circle and which subtend the same angle $2\phi = 90°$ at the centre. The two boundary planes 55, 56 along which the mould divides are perpendicular to one another and intersect one another on the axis of mould space 60 which has rotational symmetry and which is bounded by mould 50. The boundary planes 55, 56 are therefore profile planes of the space 60.

To open the mould and remove the finished moulding, the mould elements 51–54 are moved away from one another in the direction indicated by arrows 61–64. As can be gathered from FIG. 11, the direction of movement hereinafter referred to as the "mould release direction," is inclined at an acute angle $\beta'$ to the cross-sectional planes of the space 60. The mould release direction of any mould part makes an angle $\beta$ with the vertical, where $\beta + \beta' = 90°$. The plane including the mould release direction, which is perpendicular to the cross-sectional planes, and hence vertical, will be called hereinafter the mould release plane or movement plane.

It has always been assumed in the prior art that undercut mouldings of the kind hereinbefore described can be produced either very uneconomically or not at all in a re-usable mould. Surprisingly it has been found that this is certainly not the case; all that is necessary is for the dimensions of the mould elements and the mould release direction of each mould part to comply with very specific conditions which depend mainly upon the geometry of the required end product.

One such condition is that on opening the mould by withdrawal of its component elements the direction of movement or mould release direction of each element must be so inclined to the cross-sectional planes that no part of that element penetrates into or through the surface of the desired moulding during movement.

The second such condition is that for each element the angle between all profile planes intersecting that element when the mould is closed and the mould release or movement plane is less than 90°. This must be achieved by appropriate choice of the mould release direction and of the dimensions of the mould elements.

In the cross-sections through various shaped articles shown in FIGS. 3 to 7 and FIGS. 16 to 18, lines $t$ denote possible mould boundary planes for various mouldings and arrows $b$ denote possible mould release directions for the resulting mould elements. The above second condition is clearly met in these examples.

The conditions hereinbefore stated can be represented in the form of one of the following inequalities $$|\alpha_{min}{}^u|_{min} \geq \beta \geq |\alpha_{max}{}^o|_{max}$$

$$\frac{\tan \alpha_{min}{}^u}{\cos \psi \min} \geq \tan \beta \geq \frac{\tan \alpha_{max}{}^o}{\cos \psi \max}$$

Referring to FIG. 2 $\alpha_{min}{}^u$ and $\alpha_{max}{}^o$ are angles defined in a profile plane. $\alpha_{max}{}^o$ is the maximum angle which a tangent in the profile plane to the non-undercut side of the flange can make with the normal to the cross-sectional planes. $\alpha_{min}{}^u$ is the minimum angle which a tangent in the profile plane to the undercut side of the flange can make with the same normal. $\beta$ is, of course, the angle of inclination of the mould release plane to that normal.

Sections may be taken through any of the mould elements on planes parallel to the mould release plane for that element, and non-undercut and undercut tangents respectively can be drawn to the non-undercut and undercut sides of the flange in these mould release parallel planes. For any element $[\alpha_{max}{}^o]_{max}$ is the maximum angle which any non-undercut tangent in any of these mould release parallel planes makes with the normal to the cross-sectional planes, and $[\alpha_{min}{}^u]_{min}$ is the minimum angle which any undercut tangent in any of these mould release parallel planes makes with that normal.

For any element $\psi_{max}$ and $\psi_{min}$ respectively denote the maximum and minimum possible angles respectively, between a profile plane intersecting that element and the mould release plane for the element. As the drawings show, the mould release direction can in practice always be so chosen that $\psi_{min}$ is zero.

FIGS. 3–7 and FIGS. 16–18 also indicate by chain-dotted lines $b$ those regions of the article where $[\alpha_{min}{}^u]_{min}$ is disposed. Clearly, for many cross-sectional shapes such regions are limited to a single line, whereas for others the regions can be quite wide. Similar considerations apply to the regions $a$ of the maximum tangent angles $[\alpha_{max}{}^o]_{max}$, such regions usually coinciding with the boundary planes. The angle $\beta$ of the mould release direction should be chosen according to the extent of the zones $a$ and $b$. If $\delta$ denotes the angular difference between $[\alpha_{min}{}^u]_{min}$ and $[\alpha_{max}{}^o]_{max}$, a practical rule-of-thumb for selecting the angle $\beta$ is given by the following formula:

$$\beta = [\alpha_{min}{}^u]_{min} - \frac{\delta}{n}$$

in which $n$ denotes a number greater than 1. As a rule, the undercuts of the moulding profile should be such that in the case of cross-sectional shapes having relatively wide critical zones $a$ or $b$, there are relatively large angular differences $\delta$.

FIGS. 13 to 18 illustrate an important corollary of the formulae just specified. The flanges of the articles are for the sake of simplicity shown in FIGS. 13 to 18 as conical surfaces, but the following results can readily be extended to cover any desired circumferential flange profile. If the cone defined by the non-undercut surface of the flange has a constant angle of divergence the flange can be more undercut on its underside in proportion as the number of mould elements is increased. Applying this concept to any flange profiles, this means that if the upper surface of the flange has a constant profile, i.e., if there is a given angle $\alpha_{max}{}^o$, the undercut can be deeper in proportion as the number of mould parts increases, the angle $\alpha_{min}{}^u$ coming closer and closer to the angle $\alpha_{max}{}^o$.

At mould release the mould release forces have a downward component acting on the flanges of the finished article, and so the same must bear on pin 44 at mould release. Since temperature at mould release is still high, the moulding is often still fairly soft, and so the bearing force acting on the moulding by way of the pin 44 is not evenly distributed over the whole height of the moulding. However, this disadvantage can be obviated by a special control of mould release. Accordingly, the apparatus is provided with a programme which governs the movement pattern of the four guide tubes 25, and therefore of the four elements, as follows:

In the first stage of mould release, two oppositely positioned elements are withdrawn from the moulding only sufficiently to overcome the adhesion between them and the moulding, whereafter in a second stage they are moved up to the moulding again to completely reclose the mould either with the original closing force or with a reduced closing force, whereafter in a third stage the other two mould elements are withdrawn and pulled right away from one another, and in the fourth stage the remaining two mould elements are withdrawn easily since they are no longer sticking to the moulding. The moulding can then be disengaged from the pin 44 and a new moulding operation can start.

We claim

1. A mould comprising a plurality of elements movable relative to one another in rectilinear paths to open and close the mould, the closed mould defining the surface of a moulding with a plurality of circumferential constant-profile flanges all undercut in the same direction with the surface being generated by translation of a planar profile curve through a series of profile planes so that each point on the profile curve traverses a respective closed curve in a respective cross-sectional plane perpendicular to all the profile planes wherein:

the direction of movement of each element is so inclined to the cross-sectional planes that no part of that element penetrates into or through the surface of the moulding during movement, and for each element the angle between all profile planes intersecting that element when the mould is closed and a movement plane perpendicular to the cross-sectional planes and containing the direction of movement of that element is less than 90°.

2. A mould as in claim 1 wherein the elements adjoin each other in profile planes.

3. A mould as in claim 1 wherein the movement planes coincide with profile planes.

4. A mould as in claim 1 wherein each element is mounted on a support which is mounted for powered movement.

5. A mould as in claim 4 wherein the elements are interchangeably mounted on the supports.

6. A mould as in claim 5 wherein each support is adjustable to change the direction of movement of the supported element.

7. A mould as in claim 4 wherein the supports are mounted for powered movement by hydraulic means.

8. A mould as in claim 4 wherein the supports are mounted for powered movement by pneumatic means.

9. A mould as in claim 1 comprising between three and six elements.

10. A mould as in claim 9 comprising four elements.

11. A mould as in claim 10 wherein the surface defined by the mould has rotational symmetry.

12. A mould as in claim 1 wherein the elements adjoin at planes, any adjacent two of which are at the same angle to one another.

13. A mould as in claim 1 comprising four elements mounted on supports for powered movement and provided with a programme which governs the movement of the elements so that in a first stage two oppositely positioned ones of the elements are withdrawn from a moulding, in a second stage they are moved up to the moulding again, in the third stage the other two elements are withdrawn and in the fourth stage the remaining two elements are withdrawn.

14. A mould as in claim 13 wherein the programme for movement of the elements is adapted to move up the two elements in the second stage to exert less closing force on the mould than when the mould is initially closed.

* * * * *